March 22, 1927.

G. A. BOESGER 1,621,824

DUST ARRESTER

Filed Feb. 6, 1924  7 Sheets-Sheet 1

Fig. 1.

INVENTOR.
George A. Boesger
BY
ATTORNEYS.

March 22, 1927.  G. A. BOESGER  1,621,824

DUST ARRESTER

Filed Feb. 6, 1924    7 Sheets-Sheet 7

INVENTOR.
George A. Boesger
BY Fay, Oberlin & Fay
ATTORNEYS.

Patented Mar. 22, 1927.

1,621,824

UNITED STATES PATENT OFFICE.

GEORGE A. BOESGER, OF CLEVELAND, OHIO, ASSIGNOR TO THE W. W. SLY MANUFACTURING COMPANY, OF CLEVELAND, OHIO, A CORPORATION OF OHIO.

DUST ARRESTER.

Application filed February 6, 1924. Serial No. 690,902.

The present invention relates to dust-arresting or collecting apparatus, and more particularly relates to a dust-arrester which collects the dust by passing the dust-laden air through a series of screens, the dust being shaken or knocked off the screens. The particular object of the present device is the arrangement whereby the arrester may be operated continuously. Heretofore with dust-arresters of this type such as are commonly used in connection with sand-blasting apparatus, and like installations, it has been necessary to stop the flow of air while the screens are rapped or vibrated to knock out the collected dust. In the present arrester the apparatus is divided into a series of units which are individually closed down and rapped and the operating mechanism automatically shuts each unit down and raps the same and again places it in operation so that the arrester as a whole may be operated continuously. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

The present arrester is shown as mounted on a suitable frame work comprising a series of uprights or legs 1 and cross girders 2 which form the frame work or platform, although it is of course obvious that the arrester proper could be mounted directly upon the floor of the room where the room beneath is available, the hoppers and operating mechanism extending into the room below. The uprights are provided with braces 3 which with the girders form a rigid platform, the particular construction of which is unimportant so long as a satisfactory supporting platform is provided.

Figure 1:
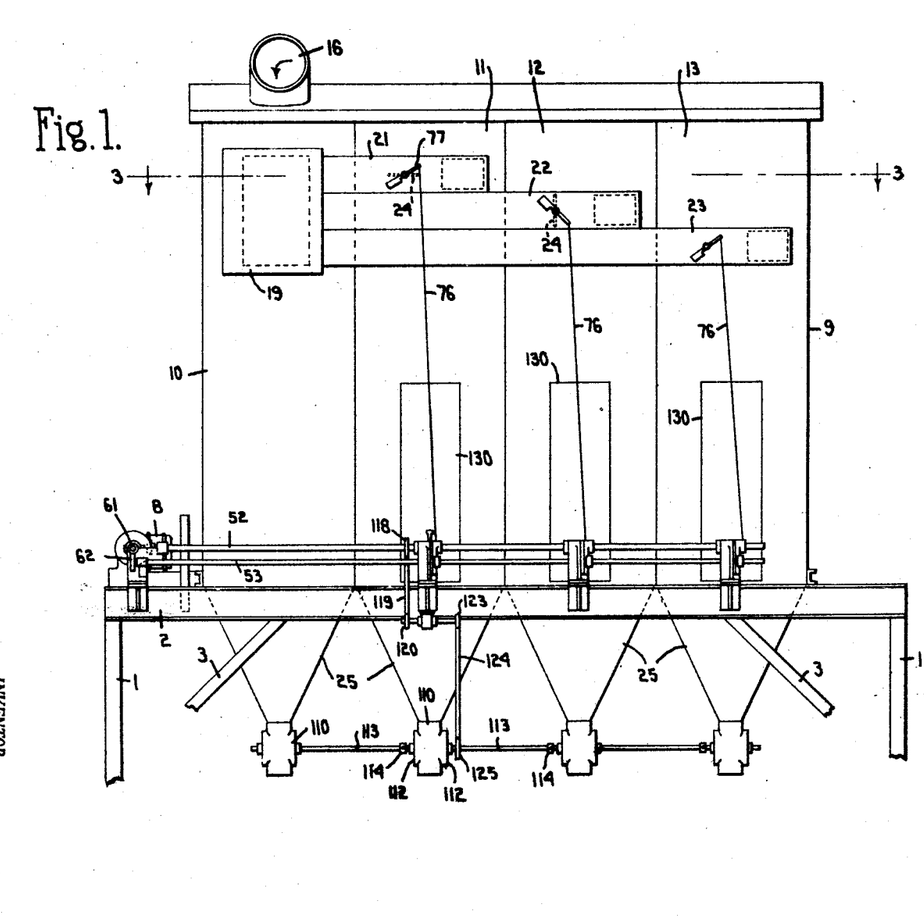
Fig. 1 is a front elevational view of the arrester shown as mounted above the floor level.
Figure 3:
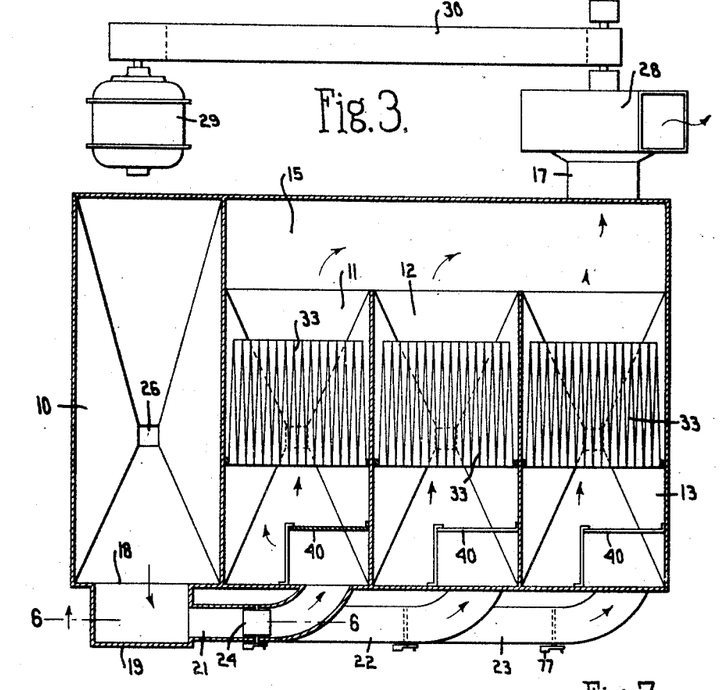
Fig. 3 is a horizontal sectional view on the line 3—3 of Fig. 1 showing a plan layout of the chambers.

The arrester proper comprises a main casing or box 9 of general rectangular form which is divided into a series of chambers. The chamber 10 at the left, as best shown in Figs. 1 and 3, extends the full depth of the main casing and is the settling chamber. There are also a series of screening or classifying chambers 11, 12, and 13, within the casing and these extend only part way through the main casing opening into a longitudinal exhaust chamber 15 at the rear. The dust-laden air enters the settling chamber through a suitable pipe or conduit 16 at the top, and the exhaust or outlet pipe 17 for the clean air is connected to the end of the exhaust chamber away from the settling chamber or opposite the screen chamber 13. The settling chamber has an opening 18 near the top communicating with a box 19 from which three conduits extend along the front of the casing, the upper conduit 21 extending to the first screen chamber 11, the second or middle conduit 22 communicating with the middle screen chamber 12 and the third or lowest conduit 23 communicating with the last screen chamber 13. Each conduit is provided with a damper 24.

The necessary air current through the arrester is obtained from a suction fan 28 mounted on the platform at the rear of the arrester and connected to the exhaust pipe 17. This fan is driven from any suitable power source, here shown as a motor 29, the motor being connected to the fan by a belt 30, but any suitable type of fan and power drive may be used.

The four chambers each have a hopper 25 at the bottom extending downwardly from the level of the platform, these hoppers ending in a narrow neck 26 from which the collected dust may be discharged into suitable drums or containers 27 which are removably mounted underneath the hoppers.

The incoming dust-laden air enters the settling chamber 10 through the pipe 16 and the heavier or coarser particles of dust or grit drop out due to the lowering of the velocity of air as it passes into the chamber. Such accumulated coarse dust, grit and dirt drops into the hopper 25 and is discharged out through the bottom opening or neck into the removable container, the neck having a continuously operating valve to be described in detail hereinafter.

The dust laden air, having lost a portion of the dust, now passes out through the conduits 21, 22 and 23 into the several screen chambers, the three chambers all being in operation at certain times. The air with heavier dust particles tends to go out through the upper conduit 21 as this is closest to the inlet pipe 16, the other two conduits taking the remainder of the dust-laden air.

Figure 7:
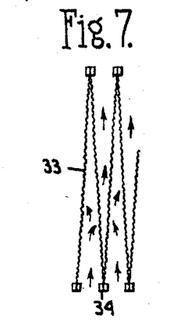
Fig. 7 is a fragmentary diagrammatic view showing the arrangement of the screens.
Figure 11:
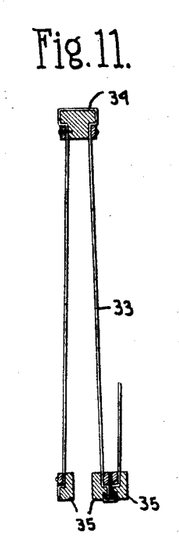
Fig. 11 is a detail sectional view of one form of an individual screen.
Figure 12:
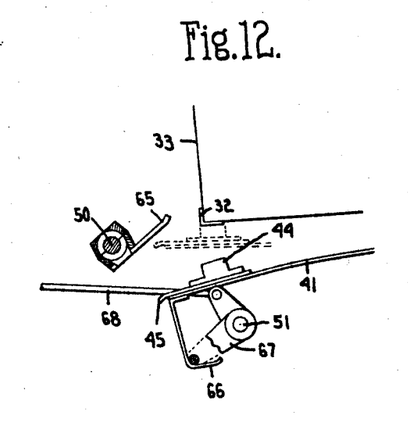
Fig. 12 is an enlarged detail view of the rapping mechanism shown in Fig. 5.

Each screen chamber is rectangular with the rear end open to the exhaust chamber 15. These three chambers are identical and each has at the back a raised plate 130 with an angle iron 31 at its top extending longitudinally of the chamber. A second angle iron 32 extends across the chamber about at the central point but slightly lower than the angle 31. The screen frames 33 rest on these two angles and fit snugly between the same and the top of the casing, each screen frame being V-shaped with the point 34 of the V toward the front. The end upright members 35 at the back of the V are secured to the adjacent members 35 (see Fig. 11) forming the screens into a unitary structure through which the air must pass (see Fig. 7) in reaching the exhaust chamber 15. As the dust-laden air passes through the screen cloth, the dust and grit is caught and held on the cloth. Some dust drops directly into the hopper. At the top of each chamber is mounted a vertical baffle plate 40 opposite the conduit opening to prevent the dust-laden air from impinging directly against the screen cloth. This baffle plate also acts to break up the air current and cause the air to drop out a certain amount of dust directly into the hopper.

The rapping mechanism for each screen chamber is the same and comprises a spring bar 41 attached at its rear end to the framework or to one of the supporting girders and having a fulcrum 42 on a longitudinal shaft 43 carried by the platform. At its forward or free end the spring bar has a hammer block 44 and an extending end or trip 45. This hammer block in the normal position of the hammer bar is in contact with the forward angle iron 32 on which the screens are supported. Operating means are provided for moving the hammer bar downwardly and then suddenly releasing the same so as to allow it to spring back and rap the angle iron 32 and thus rap or vibrate the screen to knock the accumulated dust and grit out of the same into the hopper. The operating mechanism for the hammer mechanism is arranged so that each screen chamber is shut down and rapped, the time between such rapping depending upon the material being screened, but for average use each screen is rapped for about one minute in twenty-one and the timing is so arranged that the times between rappings are even. The timing and rapping operation are automatically accomplished.

Figure 4:
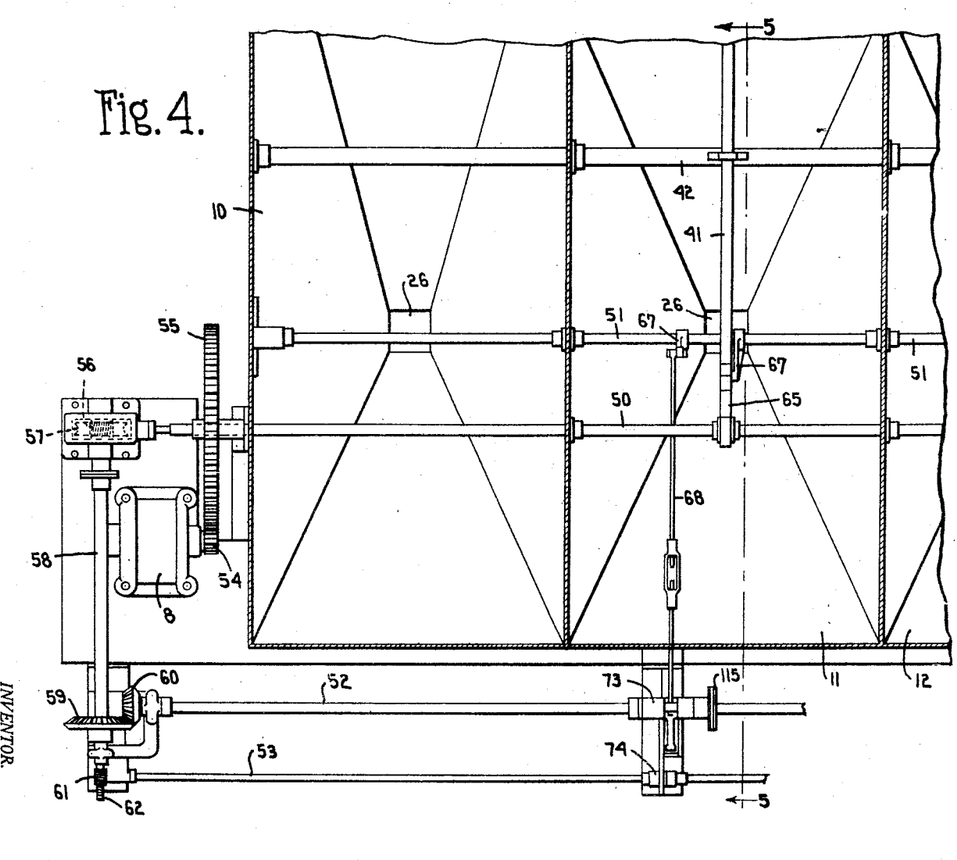
Fig. 4 is an enlarged plan view showing the arrangement of the operating mechanism, the casing walls being in section and the screens being removed.

Mounted longitudinally of the machine and underneath the screen chambers and through the same is a longitudinal extending continuously rotating shaft 50; back of this shaft are a series of rocker shafts 51 in alinement longitudinally. At the front of the arrester are two shafts 52 and 53, both rotated continuously, shaft 52 being the operating shaft and shaft 53 being the timing shaft. At the left of the machine (see Fig. 4) is mounted a motor or other constant speed power drive, the motor 8 driving through reduction gears 54 and 55 the shaft 50. This shaft has at its outer end a worm wheel 57 driving a worm 56 on a cross shaft 58 mounted at the end of the arrester. At its forward end shaft 58 is provided with a bevel gear 59 meshing with a bevel gear 60 on the operating shaft 52 and shaft 58 also has a reducing worm 61 driving the shaft 53 through a worm wheel 62. The timing shaft 53 rotates very slowly, each complete revolution being made according to the time for a complete cycle of rapping all three screens or in the usual timing the shaft makes one revolution every twenty-one minutes. The operating shaft runs at about five and one-half revolutions per minute while shaft 50, which carries the hammer trips, is driven over one hundred revolutions per minute, this speed being varied with the size of screen to give greatest rapping efficiency.

Figure 5:
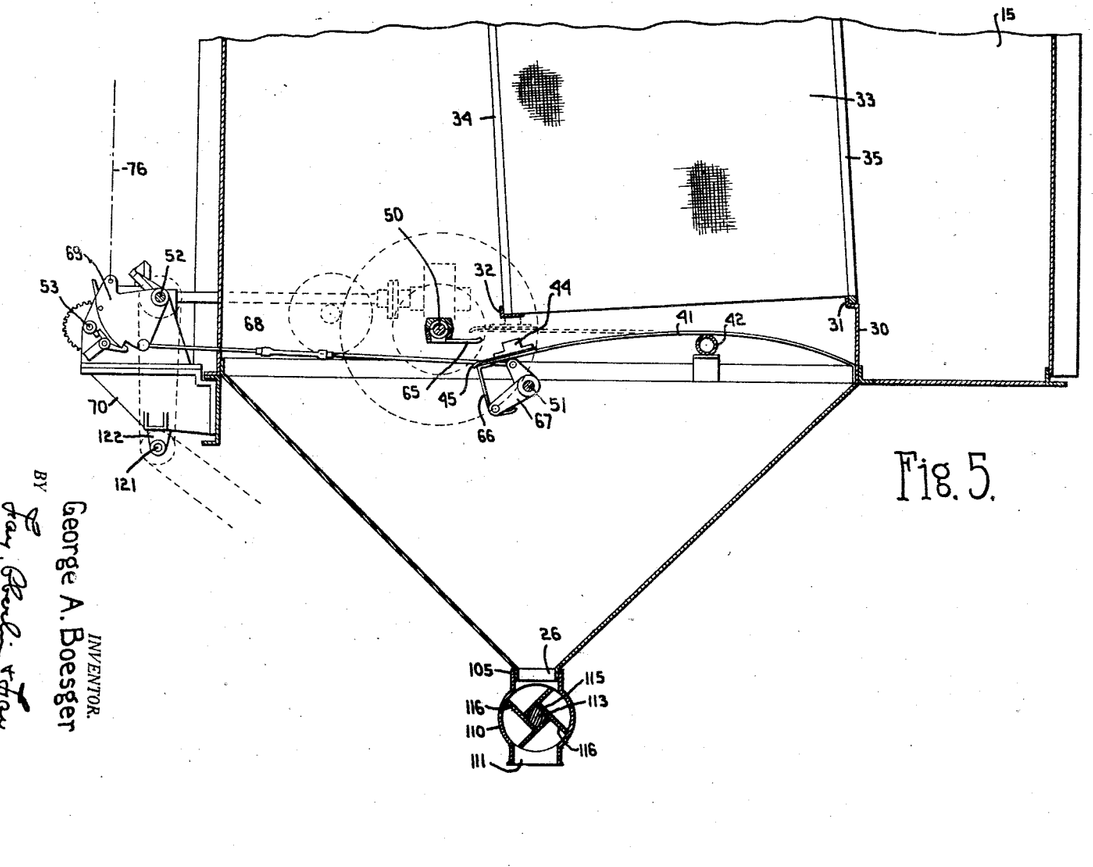
Fig. 5 is an enlarged transverse vertical section taken on the line 5—5 of Fig. 4.
Figure 6:
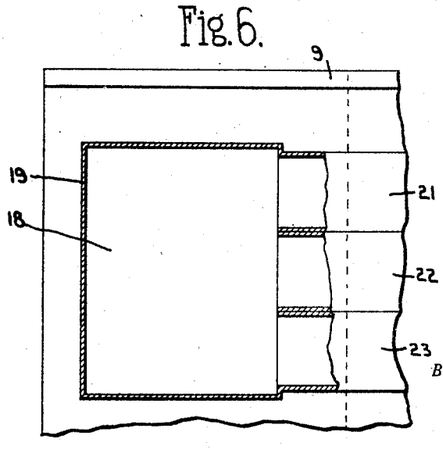
Fig. 6 is a sectional view on the line 6—6 of Fig. 3 through the air supply pipes to the various screen chambers.

Mounted on the shaft 50 are a series of hammer trips 65 adapted to contact the end of the spring bars and force them downwardly so that as they spring back the screens will be jolted or rapped, each revolution of the shaft being adapted to jolt or rap the screen once. The normal position of the spring bar 41 is in contact with the front supporting angle iron 32, but these spring bars are held away from the angle iron by means of a latch 66 riveted or otherwise attached to the end of the spring. On each rocker shaft 51 is a bell crank 67 which in its normal position, as shown in Fig. 5, engages with the latch and holds the spring bar in the position shown in full lines in Fig. 5.

Figure 8:
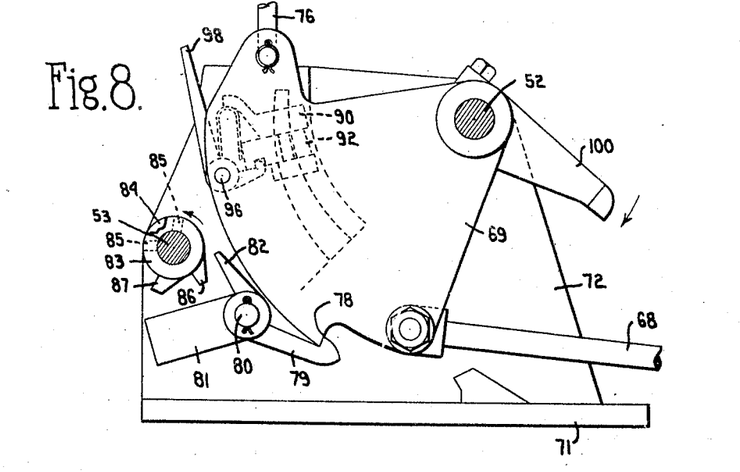
Figs. 8 and 9 are elevational views of the cam mechanism for controlling the screen rapping device, showing the same in inoperative and operative rapping positions respectively.

The controlling mechanism for these bell cranks comprises an adjustable rod 68 attached at its forward end to a pivotally mounted quadrant 69. At the front of the arrester there are mounted a series of supporting brackets 70, one for each screen chamber. On each bracket is mounted a base 71 having an upstanding plate 72 carrying a bearing 73 for the operating shaft 52 and also a bearing 74 for the timing shaft 53. This plate is provided with an eccentric slot 75. At the top, as shown in Fig. 8, the quadrant is removably connected to a rod 76 which extends vertically and is connected to the weighted damper operating arm 77.

The curved outer edge of the quadrant has a portion cut away to provide a shoulder 78 normally engaged by a latch member 79 mounted on a pin 80 carried by the plate and this member 79 has a weight 81 and a trip lever 82. When the quadrant is held in the position shown in Figs. 5 and 8, the spring bar and hammer are in their retracted inoperative position.

Figure 9:
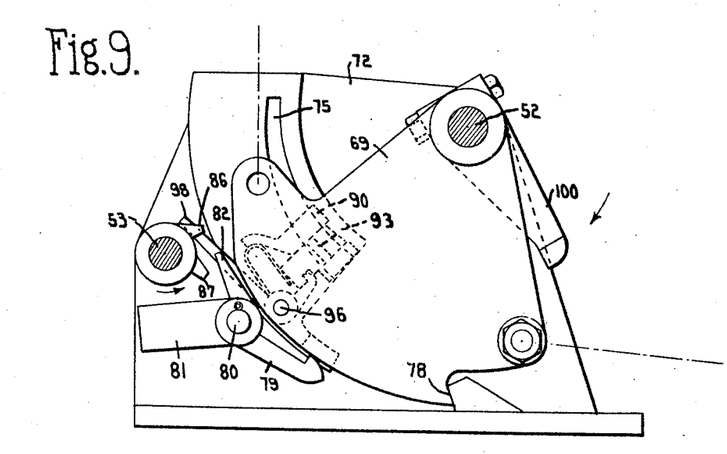

Adjustably mounted on the timing shaft 53 are pairs of collars 83 and 84, each collar being held in place by a set screw 85 or the like. The collars 83 and 84 have operating dogs 86 and 87 formed thereon respectively. As the timing shaft 53 rotates the collar 83 and the dog 86 likewise rotate until the dog 86 contacts and raises the trip lever 82 thus releasing the quadrant and allowing it to pivot about the shaft 52 due to gravity until it reaches the position shown in Fig. 9, at which point the damper is closed and the spring bar released to allow rapping of the screen.

Figure 10:
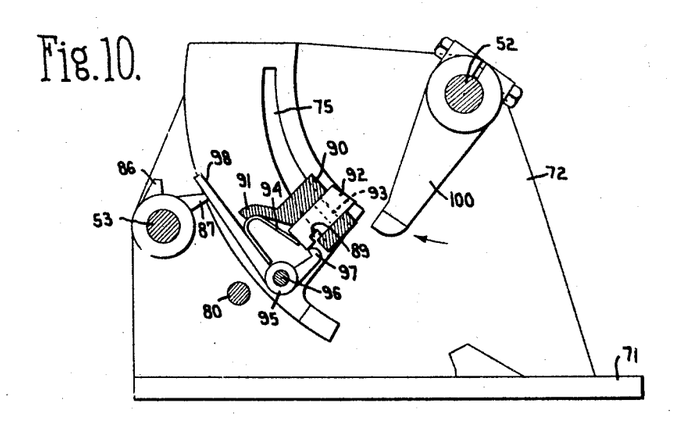
Fig. 10 is an elevational view of the same cam mechanism with a quadrant removed.

On the side next the plate the quadrant has a slotted boss 90 having a curved end 91. Within the slot is slidably mounted latch 92 having a lug 93 extending into the eccentric slot 75. This latch 92 has a notch 89 therein and is normally forced radially inward of the quadrant by the spring 94 mounted in the curved end 91 of the boss 90 and having its lower leg contacting a bell crank hook member 95 pivotally mounted about a pin 96 in the plate, the hook end 97 of the bell crank engaging in the notch 89 to hold the latch 92 in its retracted position. The arm 98 of the bell crank extends outwardly into the path of travel of the dog 87 on the collar 84. As the dog 87 contacts the arm 98, it raises the latter until the hook is withdrawn from the notch allowing the latch to move in the boss to the position shown in Fig. 10. Mounted on the shaft 52 are a series of lifting or operating fingers 100 which rotate continuously, each finger being in line with the latch 92 for each screen chamber. As the latch 92 takes the position shown in Fig. 10, it projects into the path of movement of the finger 100 and the rotation of the finger moves the latch and quadrant about the shaft as a center until the quadrant reaches the position shown in Fig. 8, when the latch member 79 will engage with the shoulder 78 to prevent return of the quadrant. During this movement of the quadrant, the latch 92 is gradually retracted due to the action of the lug 93 in the eccentric slot 75 so the latch is withdrawn from the path of the finger when the quadrant is caught by the latch member 79. As the latch 92 is fully retracted the hook bell crank 95 pivots under the action of the spring 94 so as to retain the latch in its retracted position. The damper is of course opened by the movement of the rod 76. The entire operating mechanism is thus again set for the next revolution of the timing shaft.

The three operating quadrants for the three screen chambers are of course timed to start rapping at regular intervals and the length of time which each screen will be rapped is determined by the angle between the dogs 86 and 87 on each pair of collars 83 and 84, the normal rapping time being approximately one minute for each twenty minutes of screening, but this will vary with the use to which the arrester is placed and the type and number of machines with which it is used.

In a dust arrester which is operating continuously and in which each screen chamber is connected to a common exhaust chamber, it is necessary to have the hopper bottoms closed so that air cannot be sucked therethrough and when one chamber is being rapped and the dirt and dust knocked from the screen the chamber must not only be cut off from the dust-laden air supply but must also be provided with means whereby the dirt, dust or grit may be removed and at the same time the chamber must be substantially sealed against the entrance of air through the dust outlet. To accomplish this purpose each hopper neck 26, including that of the settling chamber, is provided with a valve casing 110 having a flange 105 fitting over and secured to the neck 26 and having an outlet pipe 111. Each casing has at its sides apertured bearing plates 112 carrying an operating shaft 113, the shaft of one valve casing being coupled to the next by flexible couplings 114 to form a continuous shaft. Within the cylindrical center portion of the casing is mounted a rotating valve 115 comprising a series of blades or wings 116 here shown as four in number, secured together to form a squared central opening to receive the squared portion of the shaft 113 to drive the valve.

Thus each valve is a revolving member forming with the casing four compartments, one of which is open to the inlet and one of which is open to the outlet, but at all times one blade or wing closes each side of the valve preventing the passage of an air current therethrough. The valves are continuously driven from the operating shaft. Mounted on the operating shaft at one point is a sprocket 118 connected by a chain 119 to a sprocket 120 mounted on a short shaft 121 carried by a bearing bracket 122 supported from one of the brackets 70. This shaft 121 has a second sprocket wheel 123 which drives the valve shaft 113 by means of a chain 124 and a sprocket 125.

Figure 2:
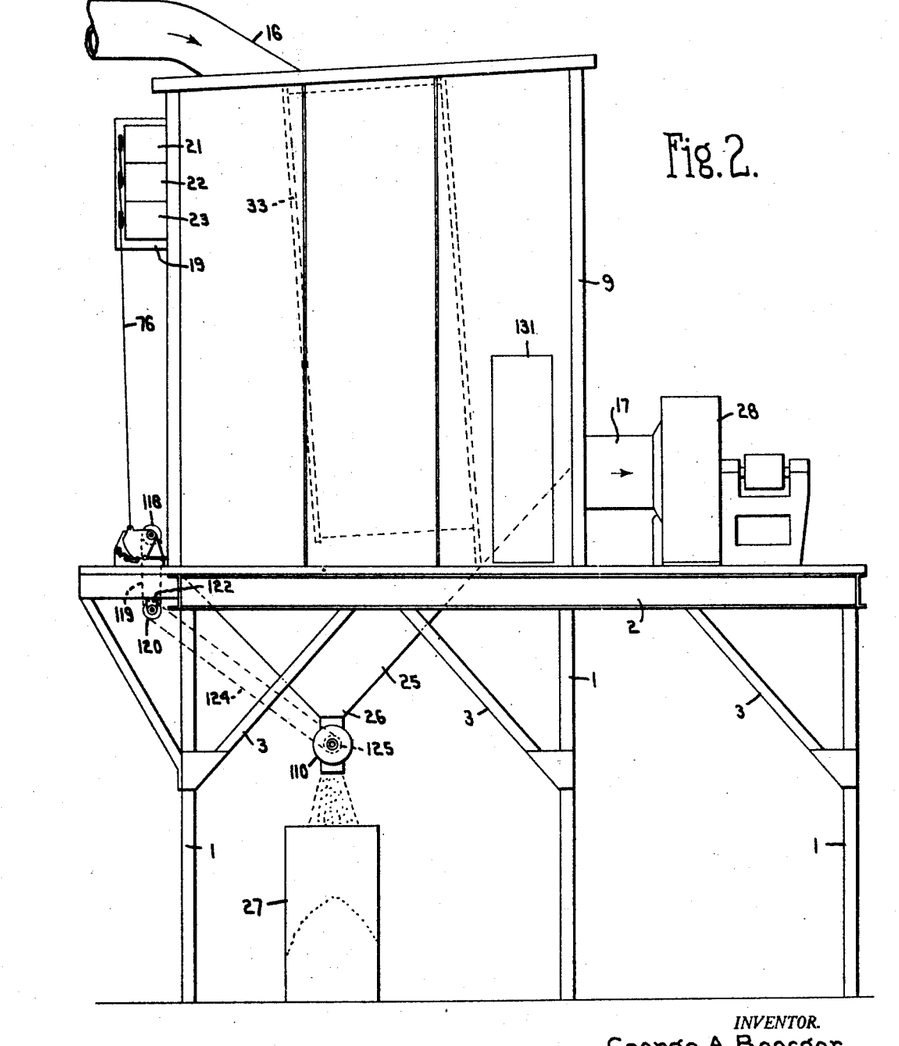
Fig. 2 is an end elevation of the arrester from the right of Fig. 1.

In order to allow for cleaning the various chambers or to replace screens, each chamber is provided with a door or removable plate, the doors 130 for the screen chambers being mounted in the front thereof while the door 131 for the exhaust chamber is at the end as shown in Fig. 2. An entrance door (not shown) to the settling chamber is also provided which is located at the end opposite to that shown in Fig. 2.

The operation of the arrester in use is continuous. Starting at the beginning of a cycle the exhaust fan will be operating and dust-laden air will be entering the settling chamber through the inlet pipe 16. A certain amount of the dirt or grit, the heavier or coaser particles, will be precipitated out in this chamber and will be discharged through its rotating valve into a suitable receptacle placed under the valve. At this time all three screen chambers will be in operation, the rest of the dust-laden air being drawn through the conduits 21, 22 and 23 and the screens in the chambers where the dirt and dust will be removed, the cleaned air passing out through the exhaust chamber and through the suction fan. When the arrester has been operated for approximately one third of the cycle, one of the chambers will be shut off from the dust-laden air through the timing mechanism and the damper and the screen will be rapped or vibrated to drop the dust into the hopper where it will pass out through the valve. At the end of the first third of the cycle the first chamber will again be put in operation and all three chambers will operate together until near the end of the second third of the cycle, when the second chamber will be cut off and the screens rapped. At the end of two-thirds of the cycle the second chamber will again be put into operation and near the end of the complete cycle the third chamber will be cut off, rapped and then restored to operation.

The length of time for each cycle is fixed by the motor speed and the reduction gearing and will be determined prior to setting up the arrester, depending upon the work which the arrester must do, that is, the kind and amount of dirt, grit or the like to be arrested and the volume of dust-laden air to be handled. The length of time which each screen is rapped is adjustable by changing the relative position of the collars 83 and 84 on the timing shaft and will be adjusted to suit operating conditions. The size of the arrester and the size of the screen chambers will be varied to suit the conditions the arrester must meet and where the screen chambers are large, a plurality of spring bars and hammers may be used for each chamber, the hammers for each chamber being operated in unison.

By so arranging the arrester that it may be operated continuously no shutting down of the machines or other devices from which the dust and dirt is taken is necessary. As all three chambers are operating for the greater part of the time it is not essential to increase the arrester capacity as any two chambers can carry the overload for the inconsiderable time which is used in rapping the other chamber. Thus time is saved over the usual type of arrester which must be shut down to rap or vibrate the screens and this by increasing the total capacity of the arrester only slightly. The device is automatic in its operation and the timing and operating mechanism is outside of the arrester proper so as not to be covered with the collected dirt and grit. Furthermore, all operating parts are easy to get at and change, adjust or replace, as may be required.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a continuous dust arrester, the combination of a settling chamber having a dust-laden air intake, a plurality of screen chambers individually connected to said settling chamber, suction exhaust means connected to said screen chambers, continuous discharge means for said chambers adapted to prevent ingress of air therethrough into said chambers, and means for selectively shutting off the dust-laden air supply to said chambers and for rapping the screens therein to remove the accumulated dust.

2. In a continuous dust arrester, the combination of a settling chamber having a dust-laden air intake, a plurality of screen chambers individually connected to said settling chamber, suction exhaust means connected to said screen chambers, continuous discharge means for said chambers adapted to prevent ingress of air therethrough into said chambers, and power driven means adapted to automatically shut down individual chambers from such dust-laden air, rap the screens in such shut down chamber, discharge the accumulated dust and return such chambers to operation.

3. In a continuous dust arrester, the combination of a settling chamber having a dust-laden air intake, a plurality of screen chambers individually connected to said settling chamber, suction exhaust means connected to said screen chambers, continuous discharge means for said chambers adapted to prevent ingress of air therethrough into said chambers, power driven means adapted to automatically shut down individual chambers from such dust-laden air, rap the screens in such shut down chamber and return said chambers to operation, and discharge means for all of said chambers adapted to discharge material continuously without allowing ingress of air through said discharge means.

4. In a continuous dust arrester, the combination of a settling chamber having a dust-laden air inlet, a plurality of screen chambers individually connected to said settling chamber, an exhaust chamber communicating with said screen chambers, and means for creating an exhaust pressure in said exhaust chamber, discharge hoppers for all said chambers, and power means adapted to automatically cut off said screen chambers individually from said settling chamber, vibrate the screens in the chamber cut off to drop the dirt into the hopper, and return said chamber to operation.

5. In a continuous dust arrester, the combination of a settling chamber having a dust-laden air inlet, a plurality of screen chambers individually connected to said settling chamber, an exhaust chamber communicating with said screen chambers, and means for creating an exhaust pressure in said exhaust chamber, discharge hoppers for all said chambers, power means adapted to automatically cut off said screen chambers individually from said settling chamber, vibrate the screens in the chamber cut off to drop the dirt into the hopper, and return said chamber to operation, and rotating discharge valve means for each hopper adapted to continuously discharge material and prevent ingress of air through said valve.

6. In a continuous dust arrester, the combination of a settling chamber provided with a dust-laden air inlet, a plurality of screen chambers, individual conduits from said settling chamber to said screen chambers, an exhaust chamber communicating with said screen chambers, means for continuously providing an exhaust pressure in said exhaust chambers, hoppers for all said chambers, screen rapping means for the screens in each chamber, dampers in said individual conduits, and power driven means for closing said dampers and operating said rapping means.

7. In a continuous dust arrester, the combination of a settling chamber provided with a dust-laden air inlet, a plurality of screen chambers, individual conduits from said settling chamber to said screen chambers, an exhaust chamber communicating with said screen chambers, means for continuously providing an exhaust pressure in said exhaust chambers, hoppers for all said chambers, screen rapping means for the screens in each chamber, dampers in said individual conduits, power driven means for closing said dampers and operating said rapping means, and adjustable timing means for controlling the closing of said chambers and the rapping thereof so as to shut down each chamber and rap the screens therein for the period necessary to remove the accumulated dust on said screens.

8. In a continuous dust arrester, the combination of a settling chamber provided with a dust-laden air inlet, a plurality of screen chambers, individual conduits from said settling chamber to said screen chambers, an exhaust chamber communicating with said screen chambers, means for continuously providing an exhaust pressure in said exhaust chambers, hoppers for all said chambers, screen rapping means for the screens in each chamber, dampers in said individual conduits, power driven means for closing said dampers and operating said rapping means, adjustable timing means for controlling the closing of said chambers and the rapping thereof so as to shut down each chamber and rap the screens therein for the period necessary to remove the accumulated dust on said screens, and continuously operating valves in said hoppers adapted to discharge accumulated dust and to prevent entrance of air through said valve.

9. In a continuous dust arrester, the combination of a settling chamber having a dust-laden air inlet, a plurality of classifying screen chambers individually connected to said settling chamber, and suction exhaust for said screen chambers.

10. In a continuous dust arrester, the combination of a settling chamber having a dust-laden air inlet, a plurality of classifying screen chambers individually connected to said settling chamber, suction exhaust for said screen chambers, and means for selectively shutting off said screen chambers from said settling chamber.

11. In a continuous dust arrester, the combination of a settling chamber having a dust-laden air inlet, a plurality of classifying screen chambers individually connected to said settling chamber, suction exhaust for said screen chambers, and means for continuously removing dust from all of said chambers.

12. In a continuous dust arrester, the combination of a settling chamber, having a dust-laden air inlet, a plurality of classifying screen chambers individually connected to said settling chamber, suction exhaust for said screen chambers, means for selectively shutting off said screen chambers from said settling chamber, and means for continuously removing dust from all of said chambers.

13. In a continuous dust arrester, the combination of a plurality of screen chambers, a dust-laden air inlet with individual branches to said chambers, suction exhaust means connected to said chambers, and continuous discharge means for each of said chambers adapted to prevent ingress of air therethrough to said chambers.

14. In a continuous dust arrester, the combination of a settling chamber having a dust-laden air inlet, a plurality of classifying screen chambers individually connected to said settling chamber, suction exhaust for said screen chamber, and means for selectively shutting off said chambers and removing the accumulated dirt from said screens.

15. In a continuous dust arrester, the combination of a settling chamber having a dust-laden air inlet, a plurality of classifying screen chambers individually connected to said settling chamber, suction exhaust for said screen chambers, means for selectively shutting off said chambers, and means for continuously removing dust from all of said chambers.

16. In a continuous dust arrester, the combination of a series of screen chambers, a dust-laden air inlet with individual branches to each chamber, suction exhaust means for said chambers, and selectively operated means for closing off said branches, removing the accumulated dirt from the screens, discharging such dirt and automatically reopening such branches.

17. In a continuous dust arrester, the combination of screen chambers, a dust-laden air inlet individually connected to said chambers, suction exhaust means for said chambers, automatically operated means for successively cutting off the air supply to said chambers, and means for removing the accumulated dirt from said chambers.

Signed by me this 2nd day of February, 1924.

GEORGE A. BOESGER.